United States Patent [19]

Ahn

[11] Patent Number: 5,505,486
[45] Date of Patent: Apr. 9, 1996

[54] AIR BAG MOUNTING DEVICE

[75] Inventor: Byung H. Ahn, Ulsan, Rep. of Korea

[73] Assignee: Hyundai Motor Company, Seoul, Rep. of Korea

[21] Appl. No.: 370,109

[22] Filed: Jan. 9, 1995

[30]   Foreign Application Priority Data

Apr. 1, 1994 [KR] Rep. of Korea ............... 94-6894

[51] Int. Cl.[6] ................................................. B60R 21/22
[52] U.S. Cl. ...................................... 280/730.1; 280/728.2
[58] Field of Search ............................ 280/730.1, 728.2, 280/732

[56]      References Cited

U.S. PATENT DOCUMENTS

| 4,946,191 | 8/1990 | Putsch | 280/730.2 |
|---|---|---|---|
| 5,090,729 | 2/1992 | Watanabe | 280/743.1 |
| 5,127,669 | 7/1992 | Suran et al. | 280/732 |
| 5,135,252 | 8/1992 | Suran et al. | 280/732 |
| 5,135,253 | 8/1992 | Hirashima et al. | 280/732 |
| 5,140,799 | 8/1992 | Satoh | 53/429 |
| 5,324,071 | 6/1994 | Gotomyo et al. | 280/730.1 |

*Primary Examiner*—Kenneth R. Rice
*Attorney, Agent, or Firm*—Birch, Stewart, Kolasch & Birch

[57]       ABSTRACT

An air bag mounting device includes an air bag mounted within a rear portion of the headrest such that a rear face of the headrest is a composite surface with an air bag door thereby eliminating any wasteful space in a rear passenger seat area of the vehicle. Further, directional members forming the air bag mounting structure, direct an inflated air bag toward a passenger in an improved manner.

8 Claims, 1 Drawing Sheet

U.S. Patent  Apr. 9, 1996  5,505,486

AIR BAG MOUNTING DEVICE

BACKGROUND OF THE INVENTION

1. Field of the Invention

The present invention relates to an air bag mounting device and more particularly, to an improved device for mounting an air bag to a rear face of a headrest of a vehicle so as to become a composite surface of an air bag door and a back surface cover of the headrest, so that the air bag does not create any wasteful space in a rear passenger seat area of the vehicle.

2. Description of the Related Art

Inflatable air bag structures are being commonly used in passenger vehicles to promote passenger safety in the event of an accident. Such air bag structures include inflation means which, when activated, rapidly form a gas which causes high speed inflation of air bags in front of passengers to absorb impact shock to thereby minimize injury. Sensor systems are provided to cause activation of the air bag structure immediately upon vehicle impact.

Generally, air bags are folded and mounted in relatively small canister-like housings which are positioned behind the vehicle instrument panel. The housing is slidably mounted in a chute structure which, in turn, is mounted in an opening in the instrument panel in front of the area occupied by the passenger in the front seat of the vehicle. As the air bag is deployed, it passes into the chute and is guided by the chute into the proper area within the vehicle to function in the desired shock absorbing fashion.

Recently, several types of air bag devices mounted on a rear side of a front seat of a vehicle have been introduced. However, such air bag mounting devices always create some wasteful spaces in a rear seat area so that it is inconvenient for passengers seated in the rear seat. Further, the above air bag devices are complicated in structure so that such devices are out of order frequently and do not perform well when operating.

SUMMARY OF THE INVENTION

Accordingly, it is an object of the present invention to provide an improved air bag mounting device which eliminates the above problems encountered with conventional air bag mounting devices.

Another object of the present invention is to provide an improved device for mounting an air bag to a rear face of a front headrest of a vehicle with the headrest surface becoming a composite surface of an air bag door and a back surface cover of the headrest thereby eliminating any wasteful space in a rear passenger seat area of the vehicle.

A further object of the present invention is to provide an air bag mounting device including a cross-bar located transverse to a pair of vertical bars of a headrest frame, a main support plate at an angle of 6°–10° toward a front face of the headrest, an air bag mounted to a vertical surface of an inverted L-shaped middle support portion of the main support plate, and an air bag door conforming in shape and formed as a co-planar rear surface of the headrest and a front seat whereby inflation of the air bag is guided by a pair of side support panels in an upward and rearward direction upon removal of the air bag door.

Still another object of the present invention is to provide an air bag mounting device which is simple in structure, compact in construction, inexpensive to manufacture, and durable in use.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF PREFERRED EMBODIMENTS

Figure 1:
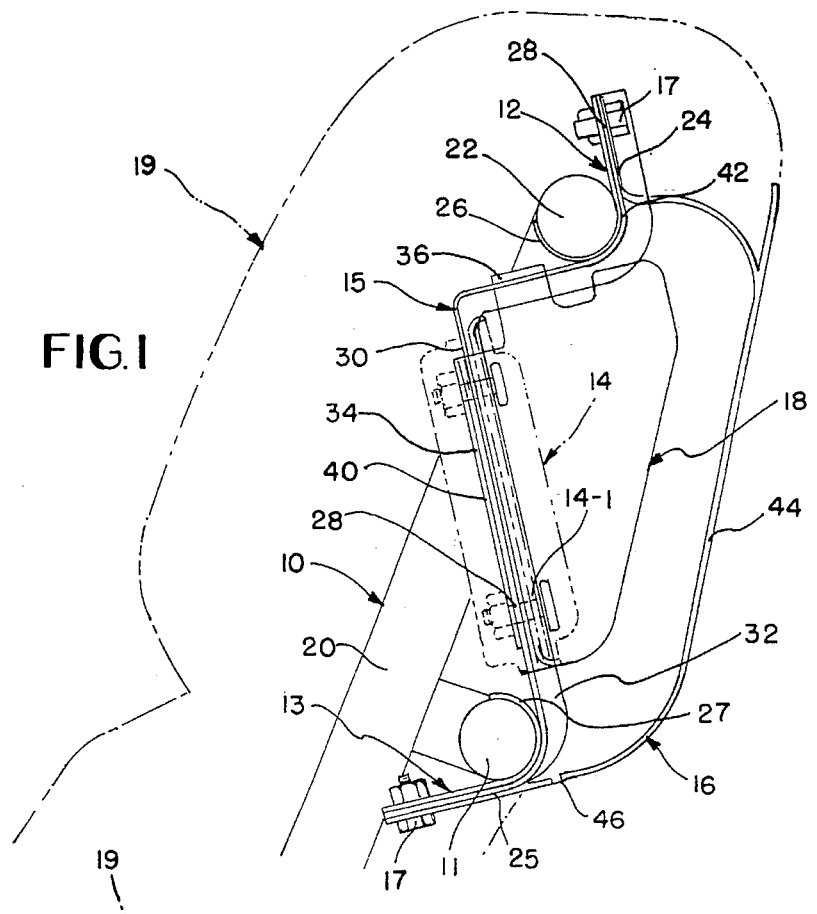
FIG. 1 is a sectional view of the air bag mounting device according to the present invention.
Figure 2:
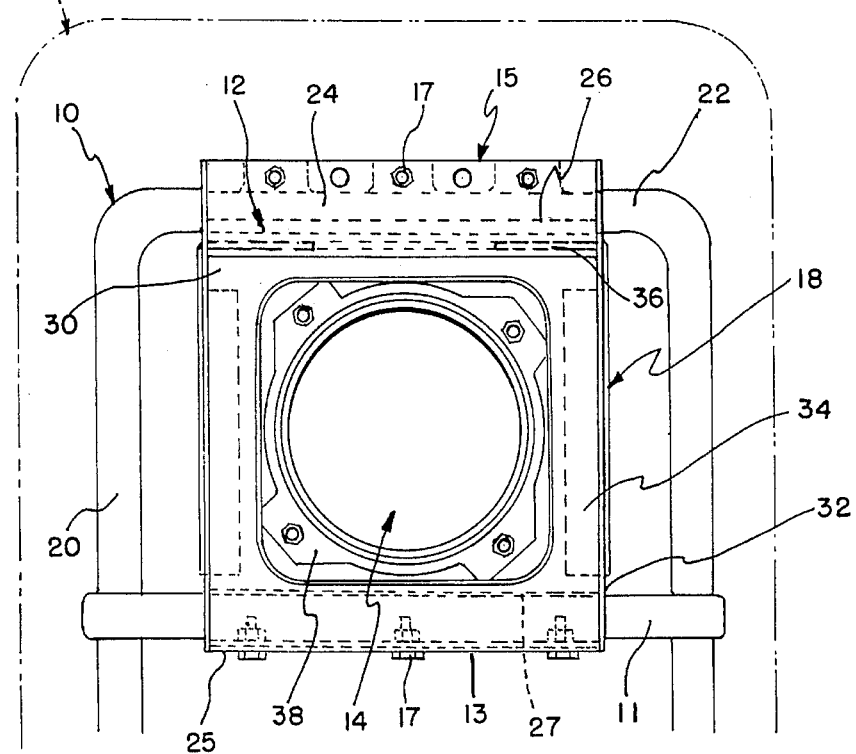
FIG. 2 is a front elevational view of the air bag mounting device without an air bag door thereof according to the present invention.

Referring now in detail to the drawings for the purpose of illustrating preferred embodiments of the present invention, the air bag mounting device as shown in FIGS. 1 and 2 comprises a headrest frame 10 formed within a headrest 19, a cross-bar 11 positioned transverse to the headrest frame 10, a main support plate 15 disposed at a front face of the headrest 19 and housed within the headrest 19, and upper and lower support brackets 12 and 13, a pair of mutually opposing side support panels 18 disposed on opposing sides of the main support plate 15, and an air bag inflator 14 mounted to a vertical surface of the main support plate 15 and having an air bag door 16.

The headrest frame 10 is of an inverted U-shape and includes a pair of vertical bars 20 and a horizontal bar 22 all integrally connected (FIG. 2).

The cross-bar 11 is disposed transverse to the pair of vertical bars 20 of the headrest frame 10 at a position corresponding to a lower end of the headrest 19. The cross bar 11 and horizontal bar 22 are both disposed in parallel within the headrest 19.

The upper support bracket 12 has a substantially vertical portion fixed to a substantially vertical flange 24 of the main support plate 15 and a bent portion 26 supporting the horizontal bar 20 of the headrest frame 10.

The lower support bracket 13 has a substantially horizontal portion fixed to a substantially horizontal flange 25 of the main support plate 15 and a bent portion 27 supporting the cross-bar 11.

In these cases, the upper and lower support brackets 12 and 13 have a certain width and a certain length corresponding to a diameter and a length of the horizontal bar 20 and the cross-bar 11, respectively. And the bent portions 26 and 27 of the upper and lower support brackets 12 and 13 have a plurality of bolt apertures 28 for bolts 17.

The upper and lower support brackets 12 and 13 support the horizontal bar 20 and the cross-bar 11, respectively. At this time, the bent portions 26 and 27 of upper and lower support brackets 12 and 13 wrap approximately half of the diameter of the horizontal bar 22 and the cross-bar 11, respectively.

The upper support brackets 12 are vertically fixed to the vertical flange 24 and the lower support brackets 13 are horizontally fixed to the horizontal flange 25. In detail, the upper and lower support brackets 12 and 13 have an angle of from about 6° to about 10° about the perpendicular and horizontal lines, respectively. Therefore, when the inflator 14 operates, the air bag inflates upwardly and toward the chest and face of a passenger seated on the rear passenger seat.

The main support plate 15 is disposed at an angle of from about 6° to about 10° toward a front face of the headrest 19 and housed within the headrest 19. The main support plate 15 includes the substantially vertical flange 24 at an upper end thereof and the substantially horizontal flange 25 at a lower end thereof for tightly attaching to the upper support bracket 12 and the lower support bracket 13, respectively.

The main support plate 15 contains an inverted L-shape middle support portion 30 connecting the substantially vertical and horizontal flanges 24 and 25 for retaining vertical and horizontal configurations of the vertical and horizontal flanges 24 and 25. Also, in order to firmly retain a right angle of the inverted L-shaped middle support portion 30, a pair of ribs 32 are attached to the main support plate 15. That is, since the pair of ribs 32 extend from the substantially vertical flange 24 to the substantially horizontal flange 25 through the middle support portion 30, the ribs 32 can effectively prevent the main support plate 15 from being distorted and maintain the correct inflation direction of the inflator 14.

The pair of mutually opposing side support panels 18 are disposed on the middle support portion 30 of the main support plate 15 and opposing sides of the main support plate 15. Each of the side support panels 18 includes a side portion, a back portion 34 folded transverse to the side portion and welded to the middle support portion 30, and an upper flap portion 36 at a right angle to the back portion 34 and folded and welded over a substantially horizontal surface of the inverted L-shape middle support portion 30 of the main support plate 15.

The inflator 14 having an inflator mounting flange 38 is disposed in an opening 40 of the middle support portion 30 by attaching the inflator mounting flange 38 to an edge of the opening 40 through bolts 17 in the plurality of bolt apertures 28 of the middle support portion 30 (FIG. 2).

The inflator 14 defines an air bag containing inflation means which, when activated, rapidly forms a gas which causes high speed inflation of the air bag in the rear passenger compartment to absorb impact shock and thereby minimize injury. Sensor systems (not shown) are provided to cause activation of the air bag immediately upon vehicle impact. The air bag is mounted on a substantially vertical surface of the inverted L-shaped middle support portion 30 of the main support plate 15.

The air bag door 16 is disposed over the inflator 14 for protecting the inflator 14 from the outside. The air bag door 16 includes an upper end pivotally attached to the substantially vertical flange 24 of the main support plate 15 and the upper support bracket 12 by a hinge 42, and a lower end firmly attached to the substantially horizontal flange 25 of the main support plate 15 and the lower support bracket 13.

The air bag door 16 defines a soft curved plate 44 conforming in shape and formed as a co-planar rear surface of the headrest 19 so that the air bag door 16 does not occupy a wasteful space in the rear passenger seat area of the vehicle, and a lower tear line 46 for selectively, operatively tearing the air bag door 16 and allowing opening of the air bag door 16 when the inflator 14 is activated. At this time, the air bag is guided by the pair of side support panels 18 in an upward and rearward direction for touching the chest, head, neck, and shoulder of the passenger seated on the rear passenger seat.

The air bag mounting device according to the present invention operates as follows. When a vehicle having the air bag mounting device of the present invention has an impact, sensor systems (not shown) activate to input a vehicle impact signal to the inflator 14. Therefore, when activated, the inflation means rapidly forms a gas which causes high speed inflation of the air bag.

Accordingly, the inflating air bag pushes the tear line 46, and tears and opens the soft curved plate 44 of the air bag door 16. At this time, the inflating air bag is guided by the pair of side support panels 18 which attach the upper and lower support bracket having an angle of 6°–10° about the vertical and horizontal lines. Therefore, the inflated air bag is inflating in an upward and rearward direction so as to reach the rear seat passengers, so that it is promoting passenger safety in the event of a car accident.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A device for mounting an air bag to a rear face of a headrest, said device comprising:

a headrest frame formed within said headrest, said headrest frame being of an inverted U-shape including a pair of vertical bars and a horizontal bar all integrally connected;

a cross-bar positioned transverse to the pair of vertical bars of said headrest frame at a position corresponding to a lower end of the headrest;

a main support plate positioned at an angle toward a front face of said headrest and housed within said headrest, said main support plate including a substantially vertical flange at an upper end thereof, a substantially horizontal flange at a lower end thereof, and an inverted L-shape middle support portion connecting the substantially vertical and horizontal flanges;

an upper support bracket having a substantially vertical portion fixed to the substantially vertical flange of said main support plate and a bent portion supporting the horizontal bar of said headrest frame;

a lower support bracket having a substantially horizontal portion fixed to the substantially horizontal flange of said main support plate and a bent portion supporting said cross-bar;

a pair of mutually opposing side support panels positioned on opposing sides of said main support plate and disposed on said middle support portion, each of said pair of side support panels having a side portion, a back portion folded transverse to the side portion, and an upper flap portion at a right angle to the back portion and folded over a substantially horizontal surface of the inverted L-shaped middle support portion of said main support plate;

an air bag mounted to a substantially vertical surface of the inverted L-shaped middle support portion of said main support plate;

means for inflating said air bag; and an air bag door having an upper end pivotally attached to said substantially vertical flange, and a lower end firmly attached to said substantially horizontal flange of said main support plate, said lower end having a tear line for operatively separating the upper end from the lower end so as to open the air bag door, said air bag door conforming in shape and formed as a co-planar rear surface of said headrest, wherein inflation of the said air bag is guided by said pair of side support panels in an upward and rearward direction upon removal of said air bag door.

2. The device for mounting an air bag according to claim 1, wherein the angle of said main support plate is from about 6° to about 10°.

3. The device for mounting an air bag according to claim 1, wherein said air bag door defines a soft curved plate for becoming a composite with a back side surface of the headrest.

4. The device for mounting an air bag according to claim 1, wherein the back portion of said side support panels and the upper flap portion of said side support panels are fixed to said main support plate by welding.

5. The device for mounting an air bag according to claim 1, wherein said means for inflating said air bag includes a rapidly formed gas whose expansion within said air bag is automatically initiated.

6. The device for mounting an air bag according to claim 1, further comprising means for fixing each of said upper support bracket and said lower support bracket to said main support plate.

7. The device for mounting an air bag according to claim 6, wherein said means for fixing includes a plurality of bolts.

8. The device for mounting an air bag according to claim 6, wherein said means for fixing is by welding.

* * * * *